US012098289B2

(12) United States Patent
Kambe

(10) Patent No.: US 12,098,289 B2
(45) Date of Patent: Sep. 24, 2024

(54) PHOTOCHROMIC COMPOSITION

(71) Applicants: THE PILOT INK CO., LTD., Aichi (JP); KABUSHIKI KAISHA PILOT CORPORATION, Tokyo (JP)

(72) Inventor: Yasuaki Kambe, Nagoya (JP)

(73) Assignees: THE PILOT INK CO., LTD., Aichi (JP); KABUSHIKI KAISHA PILOT CORPORATION, Tokyo (JP)

( * ) Notice: Subject to any disclaimer, the term of this patent is extended or adjusted under 35 U.S.C. 154(b) by 648 days.

(21) Appl. No.: 17/414,534

(22) PCT Filed: Dec. 6, 2019

(86) PCT No.: PCT/JP2019/047972
§ 371 (c)(1),
(2) Date: Jun. 16, 2021

(87) PCT Pub. No.: WO2020/137469
PCT Pub. Date: Jul. 2, 2020

(65) Prior Publication Data
US 2022/0049103 A1 Feb. 17, 2022

(30) Foreign Application Priority Data
Dec. 27, 2018 (JP) ................. 2018-244604

(51) Int. Cl.
*C09B 67/20* (2006.01)
*C08L 23/06* (2006.01)
*C08L 77/00* (2006.01)
*C08L 77/02* (2006.01)
*C08L 101/00* (2006.01)
*C09B 67/02* (2006.01)
*C09B 67/46* (2006.01)
*C09D 5/29* (2006.01)
*C09D 11/037* (2014.01)
*C09D 11/106* (2014.01)
*C09D 11/17* (2014.01)
*C09D 11/18* (2006.01)
*C09D 11/322* (2014.01)
*C09D 11/50* (2014.01)
*C09D 125/08* (2006.01)
*C09D 125/16* (2006.01)
*C09D 133/04* (2006.01)
*C09K 9/02* (2006.01)

(52) U.S. Cl.
CPC .......... *C09B 67/0063* (2013.01); *C08L 23/06* (2013.01); *C08L 77/00* (2013.01); *C08L 77/02* (2013.01); *C08L 101/00* (2013.01); *C09B 67/009* (2013.01); *C09B 67/0097* (2013.01); *C09D 5/29* (2013.01); *C09D 11/037* (2013.01); *C09D 11/106* (2013.01); *C09D 11/17* (2013.01); *C09D 11/18* (2013.01); *C09D 11/322* (2013.01); *C09D 11/50* (2013.01); *C09D 125/08* (2013.01); *C09D 125/16* (2013.01); *C09D 133/04* (2013.01); *C09K 9/02* (2013.01); *C08L 2203/12* (2013.01); *C08L 2205/20* (2013.01); *C09K 2211/1018* (2013.01)

(58) Field of Classification Search
CPC .............. C09B 67/0063; C09B 67/009; C09B 67/0097; C09D 5/29; C09D 11/037; C09D 11/106; C09D 11/17; C09D 11/18; C09D 11/50; C09D 125/08; C09D 133/04; C09D 11/322; C09D 125/16; C09K 9/02; C09K 2211/1018; C08L 23/06; C08L 77/00; C08L 77/02; C08L 101/00; C08L 2203/12; C08L 2205/20
See application file for complete search history.

(56) References Cited

U.S. PATENT DOCUMENTS

| 5,464,567 A | 11/1995 | Knowles et al. |
| 5,840,926 A | 11/1998 | Hughes |
| 2005/0012081 A1 | 1/2005 | Yasuda et al. |
| 2014/0141689 A1 | 5/2014 | Yasuda et al. |

FOREIGN PATENT DOCUMENTS

| JP | 11-116565 | 4/1999 |
| JP | 2005-48159 | 2/2005 |
| JP | 2010-180396 | 8/2010 |
| JP | 2014-121860 | 7/2014 |
| JP | 2014-122318 | 7/2014 |
| JP | 2014-231573 | 12/2014 |
| JP | 2015-137259 | 7/2015 |
| JP | 2017-132114 | 8/2017 |
| JP | 2018-1757 | 1/2018 |
| WO | 2013/008936 | 1/2013 |
| WO | 2015/111744 | 7/2015 |

OTHER PUBLICATIONS

International Search Report issued Feb. 10, 2020 in International (PCT) Application No. PCT/JP2019/047972.
International Preliminary Report on Patentability issued Jun. 16, 2021 in International (PCT) Application No. PCT/JP2019/047972.

*Primary Examiner* — Patrick D Niland
(74) *Attorney, Agent, or Firm* — Wenderoth, Lind & Ponack, L.L.P.

(57) ABSTRACT

Disclosed is a photochromic composition comprising a naphthopyran-based photochromic compound having a specific structure and an oligomer.

22 Claims, 1 Drawing Sheet

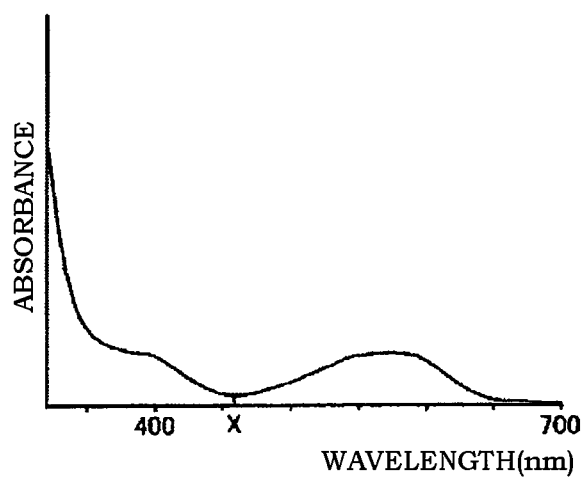

PHOTOCHROMIC COMPOSITION

TECHNICAL FIELD

The present disclosure relates to a photochromic composition. More particularly, the present disclosure relates to a photochromic composition using a naphthopyran-based photochromic compound, which develops an orange to red color at the time of coloration and can adjust the discoloration sensitivity, and also exhibits high density in a colored state and little residual color in a decolorized state.

BACKGROUND ART

There has hitherto been disclosed, as a photochromic material having improved light fastness and coloration density, a photochromic material comprising a photochromic compound selected from a spirooxazine derivative or a spiropyran derivative, and a styrene-based oligomer having a weight-average molecular weight of 200 to 6,000 (see, for example, Patent Document 1).

There is also disclosed, as a photochromic material which has sufficient coloration density and can adjust the decolorization sensitivity, a photochromic material comprising a photochromic compound selected from a spirooxazine derivative or a spiropyran derivative, and an acrylic oligomer having a weight-average molecular weight of 12,000 or less (see, for example, Patent Document 2).

There is also disclosed, as a photochromic composition which can adjust the discoloration sensitivity, a photochromic composition comprising a chromene-based photochromic compound having a specific structure and a styrene-based or terpene-based oligomer having a weight-average molecular weight of 250 to 4,000 (see, for example, Patent Document 3).

There is also disclosed, as a photochromic color material which develops little residual color in a decolorized state and high density in a colored state, a photochromic color material comprising a photochromic compound and a terpenephenol resin (see, for example, Patent Document 4).

The above-mentioned Patent Documents 1 to 4 disclose inventions which can improve the light fastness and the coloration density, and can be applied to various fields such as toy field, writing instrument field, education field, medical field, interior field, decoration field and printing field by adjusting the discoloration sensitivity, but do not disclose application of a naphthopyran-based photochromic compound having a specific structure.

PRIOR ART DOCUMENT

Patent Document

Patent Document 1: JP 2005-48159 A
Patent Document 2: JP 2014-231573 A
Patent Document 3: JP 2010-180396 A
Patent Document 4: WO 2015/111744

DISCLOSURE OF THE INVENTION

Problems to be Solved by the Invention

According to the embodiments of the present invention, there is provided a photochromic composition using a naphthopyran-based photochromic compound having a specific structure and an oligomer, which can adjust the discoloration sensitivity, and exhibits high density in a colored state and little residual color in a decolorized state.

Means for Solving the Problems

A requirement of the embodiments of the present invention is a photochromic composition comprising a photochromic compound represented by the following general formula (1) and an oligomer:

[Chemical Formula 1]

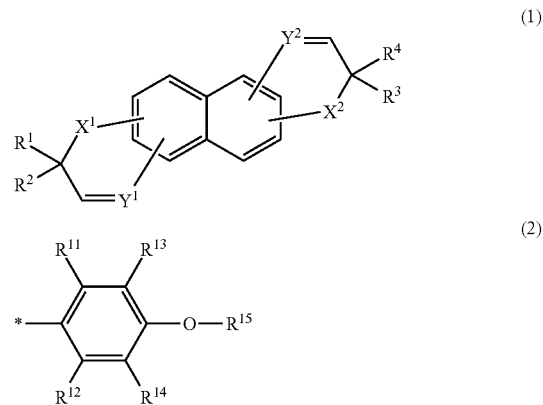

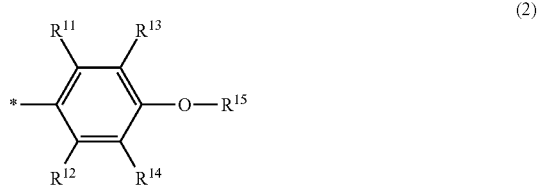

wherein, in the general formula (1), $X^1$ and $X^2$ represent an oxygen atom, $Y^1$ and $Y^2$ represent CH, $R^1$ to $R^4$ represent the general formula (2), $R^{11}$ to $R^{14}$ represent a hydrogen atom, a halogen atom, a hydroxyl group, a nitrile group, an alkyl group, an aryl group, an alkoxy group, an aryloxy group, an acyl group, an alkoxycarbonyl group or an aryloxycarbonyl group, $R^{15}$ represents an alkyl group having 3 or more carbon atoms, * represents a binding site to a pyran skeleton, and $X^1$ and $Y^1$, and $X^2$ and $Y^2$ are each bonded to adjacent carbon atoms of the carbon atoms constituting a naphthalene skeleton.

Another requirements are that, in certain embodiments, the general formula (1) is any one of the following general formulas (3) to (9); in certain embodiments, the general formula (1) is any one of the following general formulas (5) to (9); and in certain embodiments, $R^{15}$ is an alkyl group having 3 or more and 8 or less carbon atoms.

[Chemical Formula 2]

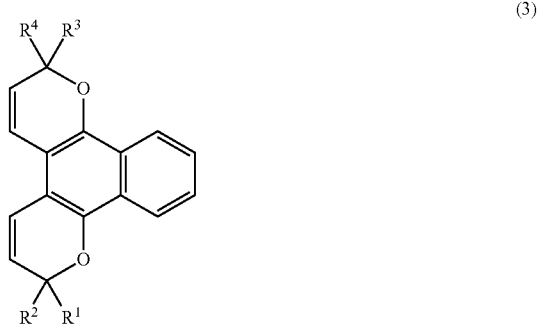

(4)

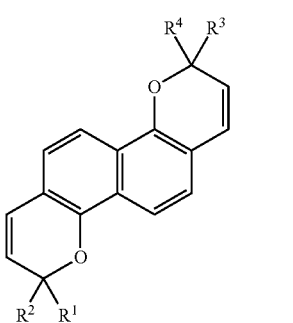

(5)

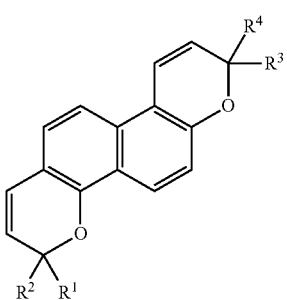

(6)

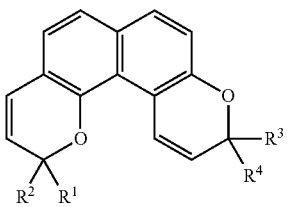

(7)

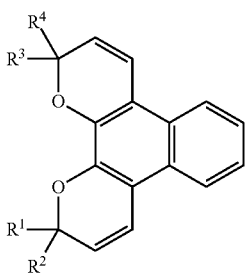

(8)

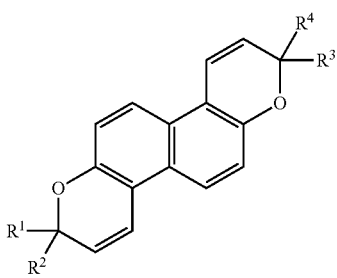

(9)

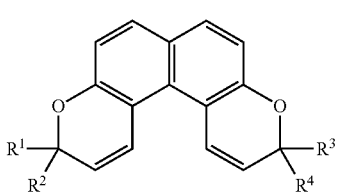

Another requirements are that, in certain embodiments, the oligomer is an oligomer selected from a styrene-based oligomer having a weight-average molecular weight of 200 to 6,000, an acrylic oligomer having a weight-average molecular weight of 12,000 or less, a terpene-based oligomer having a weight-average molecular weight of 250 to 4,000 and a terpenephenol-based oligomer having a weight-average molecular weight of 200 to 2,000; in certain embodiments, a weight ratio of the photochromic compound to the styrene-based oligomer or the acrylic oligomer is in the range of 1:1 to 1:10000; in certain embodiments, a weight ratio the photochromic compound to the terpene-based oligomer is in the range of 1:1 to 1:5000, in certain embodiments, a weight ratio of the photochromic compound to the terpenephenol-based oligomer is in the range of 1:1 to 1:50; and in certain embodiments, the photochromic compound and the oligomer are encapsulated in microcapsules or dispersed in resin particles.

Another requirements are that, in certain embodiments, the photochromic composition comprises an ultraviolet absorber; and in certain embodiments, the photochromic composition comprises an ultraviolet absorber and a hindered amine-based light stabilizer.

Still another requirements are that, in certain embodiments, a photochromic liquid composition comprising the photochromic composition and a vehicle; in certain embodiments, the photochromic liquid composition is selected from printing inks, inks for writing instruments, inks for applicators, inkjet inks, paints, ultraviolet curable inks, drawing colors, cosmetics and fabric-coloring fluids; in certain embodiments, a photochromic molding resin composition comprising the photochromic composition and a molding resin; in certain embodiments, a photochromic molded body obtained by molding the photochromic molding resin composition; and in certain embodiments, a photochromic laminated body comprising a support and a photochromic layer containing the photochromic composition provided on the support.

Still another requirements are that, in certain embodiments, an article using the photochromic composition; and in certain embodiments, the article is a toy, a packaging container, an embroidery thread or an indicator.

Effects of the Invention

According to the embodiments of the present invention, there is provided a photochromic composition using a naphthopyran-based photochromic compound having a specific structure and an oligomer, which can adjust the discoloration sensitivity, and exhibits high density in a colored state and little residual color in a decolorized state.

BRIEF DESCRIPTION OF THE DRAWINGS

FIG. 1 is a graph showing a relationship between the wavelength and the absorbance of a photochromic compound.

MODE FOR CARRYING OUT THE INVENTION

Examples of the naphthopyran-based photochromic compound represented by the general formula (1), which is applied to the embodiments of the present invention, include:
2,2,7,7-tetra(4'-n-propoxyphenyl)-2H,7H-naphtho[1,2-b:4,3-b']-dipyran,
2,2,7,7-tetra(4'-isopropoxyphenyl)-2H,7H-naphtho[1,2-b:4,3-b']-dipyran, 2,2,7,7-tetra(4'-n-butoxyphenyl)-2H,7H-naphtho[1,2-b:4,3-b']-dipyran,
2,2,7,7-tetra(4'-isobutoxyphenyl)-2H,7H-naphtho[1,2-b:4,3-b']-dipyran,
2,2,7,7-tetra(4'-sec-butoxyphenyl)-2H,7H-naphtho[1,2-b:4,3-b']-dipyran,
2,2,7,7-tetra(4'-tert-butoxyphenyl)-2H,7H-naphtho[1,2-b:4,3-b']-dipyran,
2,2,7,7-tetra(4'-n-pentyloxyphenyl)-2H,7H-naphtho[1,2-b:4,3-b']-dipyran,
2,2,7,7-tetra(4'-n-hexyloxyphenyl)-2H,7H-naphtho[1,2-b:4,3-b']-dipyran,
2,2,7,7-tetra(4'-n-heptyloxyphenyl)-2H,7H-naphtho[1,2-b:4,3-b']-dipyran,
2,2,7,7-tetra(4'-n-octyloxyphenyl)-2H,7H-naphtho[1,2-b:4,3-b']-dipyran,
2,2,8,8-tetra(4'-n-propoxyphenyl)-2H,8H-naphtho[1,2-b:5,6-b']-dipyran,
2,2,8,8-tetra(4'-isopropoxyphenyl)-2H,8H-naphtho[1,2-b:5,6-b']-dipyran,
2,2,8,8-tetra(4'-n-butoxyphenyl)-2H,8H-naphtho[1,2-b:5,6-b']-dipyran,
2,2,8,8-tetra(4'-isobutoxyphenyl)-2H,8H-naphtho[1,2-b:5,6-b']-dipyran,
2,2,8,8-tetra(4'-sec-butoxyphenyl)-2H,8H-naphtho[1,2-b:5,6-b']-dipyran,
2,2,8,8-tetra(4'-tert-butoxyphenyl)-2H,8H-naphtho[1,2-b:5,6-b']-dipyran,
2,2,8,8-tetra(4'-n-pentyloxyphenyl)-2H,8H-naphtho[1,2-b:5,6-b']-dipyran,
2,2,8,8-tetra(4'-n-hexyloxyphenyl)-2H,8H-naphtho[1,2-b:5,6-b']-dipyran,
2,2,8,8-tetra(4'-n-heptyloxyphenyl)-2H,8H-naphtho[1,2-b:5,6-b']-dipyran,
2,2,8,8-tetra(4'-n-octyloxyphenyl)-2H,8H-naphtho[1,2-b:5,6-b']-dipyran,
3,3,8,8-tetra(4'-n-propoxyphenyl)-3H,8H-naphtho[2,1-b:5,6-b']-dipyran,
3,3,8,8-tetra(4'-isopropoxyphenyl)-3H,8H-naphtho[2,1-b:5,6-b']-dipyran,
3,3,8,8-tetra(4'-n-butoxyphenyl)-3H,8H-naphtho[2,1-b:5,6-b']-dipyran,
3,3,8,8-tetra(4'-isobutoxyphenyl)-3H,8H-naphtho[2,1-b:5,6-b']-dipyran,
3,3,8,8-tetra(4'-sec-butoxyphenyl)-3H,8H-naphtho[2,1-b:5,6-b']-dipyran,
3,3,8,8-tetra(4'-tert-butoxyphenyl)-3H,8H-naphtho[2,1-b:5,6-b']-dipyran,
3,3,8,8-tetra(4'-n-pentyloxyphenyl)-3H,8H-naphtho[2,1-b:5,6-b']-dipyran,
3,3,8,8-tetra(4'-n-hexyloxyphenyl)-3H,8H-naphtho[2,1-b:5,6-b']-dipyran,
3,3,8,8-tetra(4'-n-heptyloxyphenyl)-3H,8H-naphtho[2,1-b:5,6-b']-dipyran,
3,3,8,8-tetra(4'-n-octyloxyphenyl)-3H,8H-naphtho[2,1-b:5,6-b']-dipyran,
2,2,10,10-tetra(4'-n-propoxyphenyl)-2H,10H-naphtho[1,2-b:7,8-b']-dipyran,
2,2,10,10-tetra(4'-isopropoxyphenyl)-2H,10H-naphtho[1,2-b:7,8-b']-dipyran,
2,2,10,10-tetra(4'-n-butoxyphenyl)-2H,10H-naphtho[1,2-b:7,8-b']-dipyran,
2,2,10,10-tetra(4'-isobutoxyphenyl)-2H,10H-naphtho[1,2-b:7,8-b']-dipyran,
2,2,10,10-tetra(4'-sec-butoxyphenyl)-2H,10H-naphtho[1,2-b:7,8-b']-dipyran,
2,2,10,10-tetra(4'-tert-butoxyphenyl)-2H,10H-naphtho[1,2-b:7,8-b']-dipyran,
2,2,10,10-tetra(4'-n-pentyloxyphenyl)-2H,10H-naphtho[1,2-b:7,8-b']-dipyran,
2,2,10,10-tetra(4'-n-hexyloxyphenyl)-2H,10H-naphtho[1,2-b:7,8-b']-dipyran,
2,2,10,10-tetra(4'-n-heptyloxyphenyl)-2H,10H-naphtho[1,2-b:7,8-b']-dipyran,
2,2,10,10-tetra(4'-n-octyloxyphenyl)-2H,10H-naphtho[1,2-b:7,8-b']-dipyran,
3,3,6,6-tetra(4'-n-propoxyphenyl)-3H,6H-naphtho[2,1-b:3,4-b']-dipyran,
3,3,6,6-tetra(4'-isopropoxyphenyl)-3H,6H-naphtho[2,1-b:3,4-b']-dipyran,
3,3,6,6-tetra(4'-n-butoxyphenyl)-3H,6H-naphtho[2,1-b:3,4-b']-dipyran,
3,3,6,6-tetra(4'-isobutoxyphenyl)-3H,6H-naphtho[2,1-b:3,4-b']-dipyran,
3,3,6,6-tetra(4'-sec-butoxyphenyl)-3H,6H-naphtho[2,1-b:3,4-b']-dipyran,
3,3,6,6-tetra(4'-tert-butoxyphenyl)-3H,6H-naphtho[2,1-b:3,4-b']-dipyran,
3,3,6,6-tetra(4'-n-pentyloxyphenyl)-3H,6H-naphtho[2,1-b:3,4-b']-dipyran,
3,3,6,6-tetra(4'-n-hexyloxyphenyl)-3H,6H-naphtho[2,1-b:3,4-b']-dipyran,
3,3,6,6-tetra(4'-n-heptyloxyphenyl)-3H,6H-naphtho[2,1-b:3,4-b']-dipyran,
3,3,6,6-tetra(4'-n-octyloxyphenyl)-3H,6H-naphtho[2,1-b:3,4-b']-dipyran,
3,3,9,9-tetra(4'-n-propoxyphenyl)-3H,9H-naphtho[2,1-b:6,5-b']-dipyran,
3,3,9,9-tetra(4'-isopropoxyphenyl)-3H,9H-naphtho[2,1-b:6,5-b']-dipyran,
3,3,9,9-tetra(4'-n-butoxyphenyl)-3H,9H-naphtho[2,1-b:6,5-b']-dipyran,
3,3,9,9-tetra(4'-isobutoxyphenyl)-3H,9H-naphtho[2,1-b:6,5-b']-dipyran,
3,3,9,9-tetra(4'-sec-butoxyphenyl)-3H,9H-naphtho[2,1-b:6,5-b']-dipyran,
3,3,9,9-tetra(4'-tert-butoxyphenyl)-3H,9H-naphtho[2,1-b:6,5-b']-dipyran,
3,3,9,9-tetra(4'-n-pentyloxyphenyl)-3H,9H-naphtho[2,1-b:6,5-b']-dipyran,
3,3,9,9-tetra(4'-n-hexyloxyphenyl)-3H,9H-naphtho[2,1-b:6,5-b']-dipyran,
3,3,9,9-tetra(4'-n-heptyloxyphenyl)-3H,9H-naphtho[2,1-b:6,5-b']-dipyran,
3,3,9,9-tetra(4'-n-octyloxyphenyl)-3H,9H-naphtho[2,1-b:6,5-b']-dipyran,
3,3,10,10-tetra(4'-n-propoxyphenyl)-3H,10H-naphtho[2,1-b:7,8-b']-dipyran,
3,3,10,10-tetra(4'-isopropoxyphenyl)-3H,10H-naphtho[2,1-b:7,8-b']-dipyran,
3,3,10,10-tetra(4'-n-butoxyphenyl)-3H,10H-naphtho[2,1-b:7,8-b']-dipyran,
3,3,10,10-tetra(4'-isobutoxyphenyl)-3H,10H-naphtho[2,1-b:7,8-b']-dipyran,
3,3,10,10-tetra(4'-sec-butoxyphenyl)-3H,10H-naphtho[2,1-b:7,8-b']-dipyran,
3,3,10,10-tetra(4'-tert-butoxyphenyl)-3H,10H-naphtho[2,1-b:7,8-b']-dipyran,
3,3,10,10-tetra(4'-n-pentyloxyphenyl)-3H,10H-naphtho[2,1-b:7,8-b']-dipyran,
3,3,10,10-tetra(4'-n-hexyloxyphenyl)-3H,10H-naphtho[2,1-b:7,8-b']-dipyran, 3,3,10,10-tetra(4'-n-heptyloxyphenyl)-3H,10H-naphtho[2,1-b:7,8-b']-dipyran, 3,3,10,10-tetra(4'-n-octyloxyphenyl)-3H,10H-naphtho[2,1-b:7,8-b']-dipyran, and the like.

The naphthopyrane-based photochromic compound applied to the embodiments of the present invention develops an orange to red color at the time of coloration due to having an alkoxy group.

$R^{15}$ in the general formula (2) of the naphthopyran-based photochromic compound is an alkyl group having 3 or more carbon atoms, preferably an alkyl group having 3 or more and 8 or less carbon atoms, more preferably an alkyl group having 3 or 4 carbon atoms, such as a propyl group, an isopropyl group, an n-butyl group, an isobutyl group, a sec-butyl group or a tert-butyl group, and still more preferably a sec-butyl group.

When the number of carbon atoms of the alkyl group of $R^{15}$ in the general formula (2) satisfies the above range, the naphthopyran-based photochromic compound exhibits excellent solubility in the oligomer, thus making it easier to exhibit high density in a colored state.

The naphthopyran-based photochromic compound can develop a color by sunlight, and can also undergo discoloration using a light irradiator equipped with a light source for irradiating light.

The light source preferably has a peak emission wavelength in the range of 400 to 495 nm and suitably irradiates blue light. Unlike a light irradiator that irradiates ultraviolet light having a peak emission wavelength in the vicinity of 350 to 390 nm, which is a light source that satisfactorily causes discoloration of a conventional photochromic compound, the light source irradiates violet to blue light, thus having little effect on the human body, leading to high safety.

It is possible to use, as the light source, any light source having the above-mentioned peak emission wavelength, and a blue light emitting diode is preferably used.

Examples of the light emitting diode include blue LED manufactured by Nichia Corporation under the trade name of NSPB336CS (peak wavelength of 465 nm); blue LED manufactured by Kyosemi Corporation under the trade name of KED471M53A (peak wavelength of 465 nm); blue LED manufactured by SEIWA ELECTRIC MFG. CO., LTD. under the trade name of SDDB16001A1 (peak wavelength of 460 nm); purple LED manufactured by Kyosemi Corporation under the trade name of KED405UH3 (peak wavelength of 405 nm); purple LED manufactured by OPTO-SUPPLY, under the trade name of OSSV5111A (peak wavelength of 430 nm); purple LED manufactured by OPTOSUPPLY under the trade name of OSSV9131A (peak wavelength of 430 nm), and the like.

Regarding the naphthopyran-based photochromic compound, the integrated value of absorbance (x) in the wavelength range from the wavelength showing a maximum absorbance of less than 400 nm to the wavelength of 400 nm and the integrated value of absorbance (y) in a wavelength range of 400 nm to 700 nm satisfy the following expression (1) (see FIG. 1).

$$y/x \geq 0.02 \quad (1)$$

By satisfying the expression (1), the naphthopyran-based photochromic compound exhibits photochromic properties for a light source having a peak wavelength in the range of from 400 to 495 nm and can give a viewable color density upon light irradiation.

If the value of y/x is less than 0.02, even when irradiated with light using a light irradiator, the photochromic compound does not develop a color or hardly develops a color, thus failing to obtain a sufficient color density, so that it is difficult for the user to visually recognize the color change.

The value of y/x is preferably 0.025 or more, and more preferably 0.03 or more.

The naphthopyran-based photochromic compound is used by dissolving in an oligomer. Examples of the oligomer include styrene-based oligomers, acrylic oligomers, terpene-based oligomers, terpene-based oligomers, and the like.

The styrene-based oligomer to be used has a weight-average molecular weight of 200 to 6,000, and preferably 200 to 4,000.

If the weight-average molecular weight of the styrene-based oligomer exceeds 6,000, a residual color occurs by light irradiation and the coloration density easily decreases. Since it becomes difficult to adjust the discoloration sensitivity, it is desirable that the weight-average molecular weight is within the above range.

Meanwhile, if the weight-average molecular weight is less than 200, the content of the monomer increases, leading to a lack of stability, and thus the light fastness easily deteriorates.

The styrene-based oligomer is a compound having a styrene skeleton, or a hydrogenated product thereof, and specific examples thereof include a low molecular weight polystyrene, a styrene-α-methylstyrene copolymer, an α-methylstyrene polymer, a copolymer of α-methylstyrene and vinyltoluene, and the like.

Examples of the low molecular weight polystyrene include those manufactured by Sanyo Chemical Industries, Ltd. under the trade names of Hymer SB-75 (weight-average molecular weight of 2,000), Hymer ST-95 (weight-average molecular weight of 4,000), and the like.

Examples of the styrene-α-methylstyrene copolymer include those manufactured by Eastman Chemical Company under the trade names of Picolastic A-5 (weight-average molecular weight of 317), Picolastic A-75 (weight-average molecular weight of 917), and the like.

Examples of the α-methylstyrene polymer include those manufactured by Eastman Chemical Company under the trade names of Kristalex 3085 (weight-average molecular weight of 664), Kristalex 3100 (weight-average molecular weight of 1,020), Kristalex 1120 (weight-average molecular weight of 2,420), and the like.

Examples of the copolymer of α-methylstyrene and vinyltoluene include those manufactured by Eastman Chemical Company under the trade names of Piccotex LC (weight-average molecular weight of 950), Piccotex 100 (weight-average molecular weight of 1,740), and the like.

The acrylic oligomer to be used has a weight-average molecular weight of 12,000 or less, preferably 1,000 to 8,000, and more preferably 1,500 to 6,000.

If the weight-average molecular weight of the acrylic oligomer exceeds 12,000, it becomes difficult to adjust the discoloration sensitivity, so that it is desirable that the weight-average molecular weight is within the above range.

Meanwhile, if the weight-average molecular weight is less than 1,000, the content of the monomer increases, leading to a lack of stability, and thus the coloration density easily decreases and the light fastness easily deteriorates.

Specific examples of the acrylic oligomer include an acrylic acid ester copolymer, and the like.

Examples of the acrylic acid ester copolymer include those manufactured by TOAGOSEI CO., LTD. under the trade names of ARUFON UP-1170 (weight-average molecular weight of 8,000), ARUFON UP-1080 (weight-average molecular weight of 6,000), ARUFON UP-1000 (weight-average molecular weight of 3,000), ARUFON UP-1020

(weight-average molecular weight of 2,000), ARUFON UP-1010 (weight-average molecular weight of 1,700), ARUFON UH-2,000 (weight-average molecular weight of 11,000), ARUFON US-6100 (weight-average molecular weight of 2,500), ARUFON UC-3510 (weight-average molecular weight of 2,000), and the like.

The terpene-based oligomer to be used has a weight-average molecular weight of 250 to 4,000, and preferably 300 to 4,000.

If the weight-average molecular weight of the terpene-based oligomer exceeds 4,000, a residual color occurs by light irradiation and the coloration density easily decreases. In addition, it becomes difficult to adjust the discoloration sensitivity. Thus it is desirable that the weight-average molecular weight is within the above range.

Meanwhile, if the weight-average molecular weight is less than 250, the content of the monomer increases, leading to a lack of stability, and thus the light fastness easily deteriorates.

The terpene-based oligomer is a compound having a terpene skeleton, and specific examples thereof include an α-pinene polymer, a β-pinene polymer, a d-limonene polymer, and the like.

Examples of the α-pinene polymer include those manufactured by Eastman Chemical Company under the trade name of Piccolite A115 (weight-average molecular weight of 833), and the like.

Examples of the β-pinene polymer include those manufactured by Eastman Chemical Company under the trade name of Piccolite 5115 (weight-average molecular weight of 1,710), and the like.

Examples of the d-limonene polymer include those manufactured by Eastman Chemical Company, under the trade name of Piccolite C115 (weight-average molecular weight of 902), and the like The terpenephenol-based oligomer to be used has a weight-average molecular weight of 200 to 2,000, and preferably 500 to 1,200.

If the weight-average molecular weight of the terpenephenol-based oligomer exceeds 2,000, it becomes difficult to adjust the discoloration sensitivity, so that it is desirable that the weight-average molecular weight is within the above range.

Meanwhile, if the weight-average molecular weight is less than 200, the content of the monomer increases, leading to a lack of stability, and thus the light fastness easily deteriorates.

The terpenephenol-based oligomer is a compound obtained by copolymerizing a cyclic terpene monomer with phenols, or a hydrogenated product thereof, and specific examples thereof include an α-pinene-phenol copolymer, and the like.

Examples of the α-pinene-phenol copolymer include those manufactured by YASUHARA CHEMICAL CO., LTD. under the trade names of YS POLYSTAR T145 (weight-average molecular weight of 1,050), YS POLYSTAR T130 (weight-average molecular weight of 900), YS POLYSTAR T500 (weight-average molecular weight of 500), YS POLYSTAR 5145 (weight-average molecular weight of 1,050), and the like.

The weight-average molecular weight of the styrene-based oligomer, acrylic oligomer, terpene-based oligomer or terpenephenol-based oligomer is measured by the GPC method (gel permeation chromatography).

The oligomer may be used alone or in combination of two or more thereof.

The weight ratio of the photochromic compound to the styrene-based oligomer or the acrylic oligomer is preferably 1:1 to 1:10000, and more preferably 1:5 to 1:500.

The weight ratio of the photochromic compound to the terpene-based oligomer is preferably 1:1 to 1:5000, and more preferably 1:5 to 1:500.

The weight ratio of the photochromic compound to the terpenephenol-based oligomer is preferably 1:1 to 1:50, more preferably 1:2 to 1:30, and still more preferably 1:2 to 1:20.

When the weight ratio of the photochromic compound to the oligomer satisfies the above range, the photochromic compound satisfies the coloration/decolorization function and easily exhibit sufficient coloration density.

It is also possible to improve the light fastness by adding an ultraviolet absorber to the photochromic composition according to the embodiments of the present invention.

Ultraviolet absorbers are illustrated below, but the embodiments of the present invention are not limited to these compounds:
benzophenone-based ultraviolet absorbers such as 2,4-dihydroxybenzophenone,
2-hydroxy-4-methoxybenzophenone,
2,2'-dihydroxy-4,4'-dimethoxybenzophenone,
2,2',4,4'-tetrahydroxybenzophenone,
2-hydroxy-4-methoxybenzophenone-5-sulfonic acid,
2-hydroxy-4-octyloxybenzophenone,
bis-(2-methoxy-4-hydroxy-5-benzoylphenyl)methane,
2-(2'-hydroxy-3',5'-di-t-amylphenyl)-benzophenone,
2-hydroxy-4-dodecyloxybenzophenone,
2-hydroxy-4-octadecyloxybenzophenone,
2,2'-dihydroxy-4-methoxybenzophenone, and
2-hydroxy-4-benzyloxybenzophenone;
salicylic acid-based ultraviolet absorbers such as phenyl salicylate,
para-t-butylphenyl salicylate,
paraoctylphenyl salicylate,
2,4-di-t-butylphenyl-4-hydroxybenzoate,
1-hydroxybenzoate,
1-hydroxy-3-t-butylbenzoate,
1-hydroxy-3-t-octylbenzoate, and
resorcinol monobenzoate;
cyanoacrylate-based ultraviolet absorbers such as ethyl-2-cyano-3,3'-diphenylacrylate,
2-ethylhexyl-2-cyano-3,3'-diphenylacrylate, and
2-ethylhexyl-2-cyano-3-phenyl cinnate;
benzotriazole-based ultraviolet absorbers such as 2-(5-t-butyl-2-hydroxyphenyl)-benzotriazole,
2-(5-methyl-2-hydroxyphenyl)-benzotriazole,
2-[2-hydroxy-3,5-bis(a,a-dimethylbenzyl)phenyl]-2H-benzotriazole,
2-(3,5-di-t-butyl-2-hydroxyphenyl)-benzotriazole,
2-(3-t-butyl-5-methyl-2-hydroxyphenyl)-5-chlorobenzotriazole,
2-(3,5-di-t-butyl-2-hydroxyphenyl)-5-chlorobenzotriazole,
2-(3,5-di-t-amyl-2-hydroxyphenyl)-benzotriazole,
2-(3-dodecyl-5-methyl-2-hydroxyphenyl)benzotriazole,
2-(3-t-butyl-5-propyloctylate-2-hydroxyphenyl)-5-chlorobenzotriazole,
2-(2-hydroxy-5-t-octylphenyl)-2H-benzotriazole,
2-(3-t-butyl-5-octyloxycarbonylethyl-2-hydroxyphenyl)-benzotriazole,
2-(2-hydroxy-4-octyloxyphenyl)-benzotriazole,
2-[2-hydroxy-3-dimethylbenzylphenyl-5-(1,1,3,3-tetramethylbutyl)]-2H-benzotriazole, and
2-[2'-hydroxy-3'-(3'',4'',5'',6''-tetrahydrophthalimidemethyl)-5'-methylphenyl]-benzotriazole;

oxalic anilide-based ultraviolet absorbers such as ethanediamide-N-(2-ethoxyphenyl)-N'-(4-isododecylphenyl), and 2,2,4,4-tetramethyl-20-(β-lauryl-oxycarbonyl)-ethyl-7-oxa-3,20-diazodispiro(5,1,11,2)heneicosan-21-one;
triazine-based ultraviolet absorbers such as 2,4-diphenyl-6-(2-hydroxy-4-methoxyphenyl)-1,3,5-triazine,
2,4-diphenyl-6-(2-hydroxy-4-ethoxyphenyl)-1,3,5-triazine,
2,4-diphenyl-6-(2-hydroxy-4-propoxyphenyl)-1,3,5-triazine,
2,4-diphenyl-6-(2-hydroxy-4-butoxyphenyl)-1,3,5-triazine,
2,4-diphenyl-6-(2-hydroxy-4-hexyloxyphenyl)-1,3,5-triazine,
2,4-diphenyl-6-(2-hydroxy-4-pentyloxyphenyl)-1,3,5-triazine,
2,4-diphenyl-6-(2-hydroxy-4-octyloxyphenyl)-1,3,5-triazine,
2,4-diphenyl-6-(2-hydroxy-4-dodecyloxyphenyl)-1,3,5-triazine,
2,4-diphenyl-6-(2-hydroxy-4-benzyloxyphenyl)-1,3,5-triazine,
2,4-diphenyl-6-[2-hydroxy-4-(2-butoxyethoxy)phenyl]-1,3,5-triazine,
2,4-di-p-tolyl-6-(2-hydroxy-4-methoxyphenyl)-1,3,5-triazine,
2,4-di-p-tolyl-6-(2-hydroxy-4-propoxyphenyl)-1,3,5-triazine,
2,4-di-p-tolyl-6-(2-hydroxy-4-butoxyphenyl)-1,3,5-triazine,
2,4-di-p-tolyl-6-(2-hydroxy-4-hexyloxyphenyl)-1,3,5-triazine,
2,4-di-p-tolyl-6-(2-hydroxy-4-pentyloxyphenyl)-1,3,5-triazine,
2,4-di-p-tolyl-6-(2-hydroxy-4-octyloxyphenyl)-1,3,5-triazine,
2,4-di-p-tolyl-6-(2-hydroxy-4-benzyloxyphenyl)-1,3,5-triazine,
2,4-di-p-tolyl-6-[2-hydroxy-4-(2-hexyloxyethoxy)phenyl]-1,3,5-triazine,
2-{4-[2-hydroxy-3-(dodecyloxy)propyloxy]-2-hydroxyphenyl}-4,6-bis(2,4-dimethylphenyl)-1,3,5-triazine,
2-{4-[2-hydroxy-3-(tridecyloxy)propyloxy]-2-hydroxyphenyl}-4,6-bis(2,4-dimethylphenyl)-1,3,5-triazine,
2-{4-[2-hydroxy-3-(2'-ethyl)hexyloxy]-2-hydroxyphenyl}-4,6-bis(2,4-dimethylphenyl)-1,3,5-triazine,
a mixture of 2-{4-[2-hydroxy-3-(tridecyloxy)propyloxy]-2-hydroxyphenyl}-4,6-bis(2,4-dimethylphenyl)-1,3,5-triazine and 2-{4-[2-hydroxy-3-(dodecyloxy)propyloxy]-2-hydroxyphenyl}-4,6-bis(2,4-dimethylphenyl)-1,3,5-triazine,
2,4-bis(2-hydroxy-4-butoxyphenyl)-6-(2,4-bis-butoxyphenyl)-1,3,5-triazine,
2-{2-hydroxy-4-[(1-octyloxycarbonylethoxy)phenyl]}-4,6-bis(4-phenylphenyl)-1,3,5-triazine
2,4-bis(2,4-dimethylphenyl)-6-(2-hydroxy-4-octyloxyphenyl)-1,3,5-triazine,
2-(2,4-dihydroxyphenyl)-4,6-bis(2,4-dimethylphenyl)-1,3,5-triazine,
2-(2,4-dihydroxyphenyl)-4,6-diphenyl-1,3,5-triazine,
2-(2-hydroxy-4-methoxyphenyl)-4,6-diphenyl-1,3,5-triazine, and
tris(3-methylanilino)triazine; and the like.

It is also possible to further improve the light fastness by adding an ultraviolet absorber and a hindered amine-based light stabilizer in combination to the photochromic composition according to the embodiments of the present invention.

Hindered amine-based light stabilizers are illustrated below, but the embodiments of the present invention are not limited to these compounds:
bis(1,2,2,6,6-pentamethyl-4-piperidyl) sebacate,
2-(3,5-di-t-butyl-4-hydroxybenzyl)-2-n-butylmalonic acid bis(1,2,2,6,6-pentamethyl-4-piperidyl),
butane-1,2,3,4-tetracarboxylic acid tetrakis(1,2,2,6,6-pentamethyl-4-piperidyl),
butane-1,2,3,4-tetracarboxylic acid tetrakis(2,2,6,6-tetramethyl-4-piperidyl),
bis(2,2,6,6-tetramethyl-4-piperidyl) sebacate,
bis[2,2,6,6-tetramethyl-1-(octyloxy)-4-piperidyl] sebacate,
a mixed esterified product of butane-1,2,3,4-tetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane,
bis(1-octyloxy-2,2,6,6-tetramethyl) sebacate,
a mixed esterified product of butane-1,2,3,4-tetracarboxylic acid with 2,2,6,6-tetramethyl-4-piperidinol and 3,9-bis(2-hydroxy-1,1-dimethylethyl)-2,4,8,10-tetraoxaspiro[5.5]undecane,
a mixed esterified product of butane-1,2,3,4-tetracarboxylic acid with 1,2,2,6,6-pentamethyl-4-piperidinol and 1-tridecanol,
1,2,2,6,6-pentamethyl-4-piperidyl methacrylate,
a mixture of bis(1,2,2,6,6-pentamethyl-4-piperidyl) sebacate with 1-methyl-10-(1,2,2,6,6-pentamethyl-4-piperidyl) sebacate,
N,N',N'',N'''-tetrakis-{4,6-bis-[butyl-(N-methyl-2,2,6,6-tetramethylpiperidin-4-yl)amino]-triazin-2-yl}-4,7-diazadecane-1,10-diamine,
N-methyl-3-dodecyl-1-(2,2,6,6-tetramethyl-4-piperidinyl)pyrrolidine-2,5-dione, and the like.

As the hindered amine-based light stabilizer, a compound represented by the following general formula (10) is suitably used:

[Chemical Formula 3]

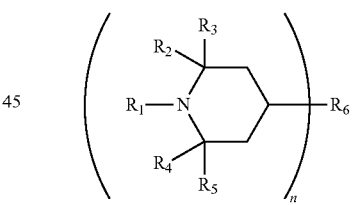

(10)

wherein $R_1$ represents an alkyl group having 1 to 30 carbon atoms, $R_2$, $R_3$, $R_4$ and $R_5$ each represent an alkyl group having 1 to 5 carbon atoms, n represents an integer of 1 or more, and $R_6$ represents an n-valent organic residue.

In the photochromic composition according to the embodiments of the present invention, a combination of an ultraviolet absorber and a hindered amine-based light stabilizer for the purpose of obtaining excellent light fastness is preferably a combination of an ultraviolet absorber selected from a benzotriazole-based ultraviolet absorber or a triazine-based ultraviolet absorber, and a hindered amine-based light stabilizer; and more preferably a combination of an ultraviolet absorber selected from 2-(2-hydroxy-5-t-butylphenyl)-benzotriazole, 2-[2-hydroxy-3-dimethylbenzylphenyl-5-(1,1,3,3-tetramethylbutyl)]-2H-benzotriazole, 2-(2-hydroxy-5-methylphenyl)-benzotriazole, or a mixture of 2-{4-[2-hydroxy-3-(tridecyloxy)propyloxy]-2-hydroxyphenyl}-4,6-bis(2,4-dimethylphenyl)-1,3,5-triazine and 2-{4-[2-hydroxy-3-(dodecyloxy)propyloxy]-2-hydroxyphenyl}-4,6-bis(2,4-dimethylphenyl)-1,3,5-triazine, and a hindered amine-based light stabilizer selected from 2-(3,5-di-t-butyl-4-hydroxybenzyl)-2-n-butylmalonic acid bis(1,2,2,6,6-pentamethyl-4-piperidyl), bis[2,2,6,6-tetramethyl-1-(octyloxy)-4-piperidyl] sebacate, or a mixture of bis(1,2,2,6,6-pentamethyl-4-piperidyl) sebacate and 1-methyl 10-(1,2,2,6,6-pentamethyl-4-piperidyl) sebacate.

The photochromic composition according to the embodiments of the present invention may be encapsulated in microcapsules to form a photochromic microcapsule pigment, or dispersed in a thermoplastic or thermosetting resin to form photochromic resin particles.

The photochromic composition can be encapsulated in microcapsules to form a chemically and physically stable pigment. There have conventionally been well-known, as the method of the microencapsulation, an interfacial polymerization method of an isocyanate-based compound, an in-situ polymerization method of a melamine-formalin-based composition, a liquid-phase curing coating method, a phase separation method from an aqueous solution, a phase separation method from an organic solvent, a melt dispersion cooling method, a gas-phase suspension coating method, a spray drying method, and the like. Any of them is appropriately selected depending on use application. On the surface of the microcapsules, another secondary resinous coating may be provided for practical use depending on the use purpose in order to impart the durability or modify the surface properties.

The photochromic microcapsule pigment preferably has a mass ratio of inclusions:wall film of 7:1 to 1:1. If the mass ratio of inclusions to wall film is in the above range, it is possible to prevent deterioration of the color density and the sharpness at the time of coloration. The mass ratio of inclusions:wall film is more preferably 6:1 to 1:1.

The photochromic microcapsule pigment or resin particles fulfill practical applicability if the average particle size is in the range of 0.5 to 100 μm, preferably 1 to 50 μm, and more preferably 1 to 30 μm.

The photochromic microcapsule pigment or resin particles lack in dispersion stability and processing suitability for the operation of blending into ink, paint or resin, if the average particle size thereof exceeds 100 μm. Meanwhile, if the average particle size thereof is less than 0.5 μm, it becomes difficult to exhibit high-density coloration.

In the measurement of the average particle size, the region of particles is determined using an image analysis type particle size distribution measuring software "Mac-View" manufactured by Mountech Co., Ltd., a projected area equivalent circle diameter (Heywood diameter) is calculated from the area of the region of particles, and the average particle size is measured as an average particle size of particles equivalent to an equal volume sphere based on the calculated value.

When the particle diameter of all particles or most of the particles exceed 0.2 μm, the average particle size can also be measured as an average particle size of particles equivalent to an equal volume sphere by the Coulter method using a particle size distribution analyzer (manufactured by Beckman-Coulter, Inc. under the product name of Multisizer 4e).

A volumetric particle size and an average particle size may be measured using a calibrated laser diffraction/scattering particle size distribution analyzer (LA-300, manufactured by Horiba, Ltd.) based on the numerical value measured by the above software or the Coulter method using a measurement device.

The photochromic composition, the microcapsule pigment or resin particles can be used for photochromic liquid compositions such as, for example, printing inks for screen printing, offset printing, process printing, gravure printing, coater printing and tampo printing: paints for brush coating, spray coating, electrostatic coating, electro-deposition coating, flow coating, roller coating and immersion coating; inks for inkjet recording; ultraviolet curable inks; inks for writing instruments or applicators such as those for marking pens, ballpoint pens, fountain pens and brush-type pens; drawing colors, cosmetics and fabric-coloring fluids; by being dispersed in a vehicle containing water and/or an organic solvent, and various additives as necessary.

Various additives can be added to the photochromic liquid composition, and examples thereof include resins, crosslinking agents, curing agents, desiccants, plasticizers, viscosity adjusters, dispersants, UV absorbers, antioxidants, light stabilizers, antisetting agents, smoothing agents, gelling agents, defoamers, delustrant agents, penetrating agents, pH adjusters, foaming agents, coupling agents, moisturizers, fungicides, preservatives, rust preventives, and the like.

Of these, examples of the vehicle for writing instruments used for inks for writing instruments ink include an oil-based vehicle containing an organic solvent, or an aqueous vehicle containing water, and an organic solvent as necessary.

Examples of the organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, N-methyl-2-pyrrolidone, and the like.

Examples of the ink for writing instruments include shear-thinning inks containing a shear-thinning agent in a vehicle, and cohesive inks containing a water-soluble polymer flocculant in a vehicle and a pigment suspended in a loosely agglomerated state.

By adding the shear-thinning agent, it is possible to suppress the aggregation and sedimentation of the pigment and also to suppress the bleeding of the handwriting, thus making it possible to form satisfactory handwriting.

Furthermore, when the writing instrument filled with the above ink is in the form of a ballpoint pen, it is possible to prevent ink from leaking from the gap between the ball and the tip when not in use, or it is possible to prevent backflow when the writing tip is left facing upward (upright state).

Examples of the shear-thinning agent include xanthan gum, welan gum, succinoglycan (average molecular weight of about 1 to 8 million), which is an organic acid-modified heteropolysaccharide whose constituent monosaccharides are glucose and galactose, guar gum, locust bean gum and derivatives thereof, hydroxyethyl cellulose, alginic acid alkyl esters, polymers having a molecular weight of 100,000 to 150,000 containing alkyl esters of methacrylic acid as main components, thickening polysaccharides having gelling ability extracted from seaweeds such as glucomannan, agar and caragenin, benzylene sorbitol and benzylene xylitol or derivatives thereof, crosslinkable acrylic acid polymers, inorganic fine particles, polyglycerin fatty acid esters, polyoxyethylene sorbitan fatty acid esters, polyethylene glycol fatty acid esters, polyoxyethylene alkyl ethers, polyoxypropylene alkyl ethers, polyoxyethylene alkyl phenyl ethers, nonionic surfactants having an HLB value of 8 to 12 such as fatty acid amides, salts of dialkyl or dialkenyl sulfosuccinic acid, mixtures of N-alkyl-2-pyrrolidone and anionic surfactants, mixtures of polyvinyl alcohol and an acrylic resin, and the like.

Examples of the water-soluble polymer flocculant include polyvinylpyrrolidone, polyethylene oxide, water-soluble polysaccharides, and the like.

Examples of the water-soluble polysaccharides include traganth gum, guar gum, pullulan, cyclodextrin, water-soluble cellulose derivatives, and the like. Specific examples of the water-soluble cellulose derivatives include methyl cellulose, hydroxyethyl cellulose, hydroxypropyl cellulose, hydroxyethyl methyl cellulose, hydroxypropyl methyl cellulose, and the like.

By using a comb-shaped polymer dispersant having a carboxyl group in the side chain and an organic nitrogen sulfur compound together with the polymer flocculant, it is possible to improve the dispersibility of loose aggregates of the microcapsule pigment by the polymer flocculant.

The comb-shaped polymer dispersant having a carboxyl group in the side chain is not particularly limited as long as it is a comb-shaped polymer compound having a plurality of carboxyl groups in the side chain, and an acrylic polymer compound having a plurality of carboxyl groups in the side chain is suitable, and specific examples thereof include those manufactured by Lubrizol Japan Limited under the trade name of Solspers 43000.

The organic nitrogen-sulfur compound further suppresses the sedimentation of the microcapsule pigment due to vibration when the writing instrument is filled with ink and put into practical use.

This further improves the dispersibility in which the loose aggregates of the microcapsule pigment are dispersed by the comb-shaped polymer dispersant having a carboxyl group in the side chain.

As the organic nitrogen sulfur compound, a compound selected from thiazole-based compounds, isothiazole-based compounds, benzothiazole-based compounds and benzoisothiazole-based compounds is used.

Specifically, one or more compounds selected from 2-(4-thiazoyl)-benzimidazole (TBZ), 2-(thiocyanatomethylthio)-1,3-benzothiazole (TCMTB), 2-methyl-4-isothiazolin-3-one and 5-chloro-2-methyl-4-isothiazolin-3-one are used as the organic nitrogen-sulfur compound, and one or more compounds selected from 2-(4-thiazoyl)-benzimidazole (TBZ), 2-methyl-4-isothiazolin-3-one and 5-chloro-2-methyl-4-isothiazolin-3-one are preferably used.

Examples of the organic nitrogen sulfur compound include those manufactured by Permachem Asia Ltd. under the trade names of Top Side 88, Top Side 133, Top Side 170, Top Side 220, Top Side 288, Top Side 300, Top Side 400, Top Side 500, Top Side 600, Top Side 700Z, Top Side 800 and Top Side 950; and those manufactured by HOKKO SANGYO Co., LTD. under the trade names of HOKUSTAR HP, HOKUSTAR E50A, HOKUSIDE P200, HOKUSIDE 6500, HOKUSIDE 7400, HOKUSIDE MC, HOKUSIDE 369 and HOKUSIDE R-150.

The mass ratio of the comb-shaped polymer dispersant having a carboxyl group in the side chain to the organic nitrogen sulfur compound is 1:1 to 1:10, and preferably 1:1 to 1:5. By satisfying the above range, it is possible to sufficiently achieve the dispersibility of loose aggregates of the microcapsule pigment and the suppression of sedimentation of the microcapsule pigment due to vibration.

The addition of a water-soluble resin applied for imparting the fixability to the paper surface of handwriting and viscosity further improves the function of enhancing the stability of the microcapsule pigment in the ink containing the above-mentioned comb-shaped polymer dispersant having a carboxyl group in the side chain and organic nitrogen sulfur compound mentioned above.

Examples of the water-soluble resin include an alkyd resin, an acrylic resin, a styrene-maleic acid copolymer, cellulose derivatives, polyvinylpyrrolidone, polyvinyl alcohol, dextrin, and the like, and polyvinyl alcohol is preferably used.

A partially saponified polyvinyl alcohol having a saponification degree of 70 to 89 mol % is more suitably used as the polyvinyl alcohol since the ink is highly soluble even in an acidic region.

The water-soluble resin is added in the ink in the amount in the range of 0.3 to 3.0% by mass, and preferably 0.5 to 1.5% by mass.

When the ink is used with being filled in a ballpoint pen, it is preferable that the abrasion of a ball receiving sheet is prevented by adding lubricants including higher fatty acids such as oleic acid, nonionic surfactants having a long chain alkyl group, polyether modified silicone oil, thiophosphorous acid triesters such as thiophosphorous acid tri(alkoxycarbonyl methyl ester) or thiophosphorous acid tri(alkoxycarbonyl ethyl ester), phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts and alkanolamine salts thereof.

The followings may be added to the ink as necessary: resins which impart the ink with the fixability on the paper surface and viscosity, such as an acrylic resin, a styrene-maleic acid copolymer, a cellulose derivative, polyvinylpyrrolidone, polyvinyl alcohol and dextrin; inorganic salts such as sodium carbonate, sodium phosphate and sodium acetate; pH regulators, for example, an organic basic compound such as an aqueous amine compound; anticorrosives such as benzotriazole, tolyltriazole, dicyclohexylammonium nitrite, diisopropylammonium nitrite and saponin; preservatives or fungicides, such as phenol, sodium salt of 1,2-benzthiazolin-3-one, sodium benzoate, sodium dehydroacetate, potassium sorbate, paraoxypropyl benzoate and 2,3,5,6-tetrachloro-4-(methylsulfonyl)pyridine; wetting agents such as urea, nonionic surfactant, reduced or non-reduced starch hydrolysate, oligosaccharides such as trehalose, sucrose, cyclodextrin, glucose, dextrin, sorbitol, mannitol and sodium pyrophosphate; defoamers; dispersants; and fluorine-based or nonionic surfactants which improve the permeability of the ink.

The ink can contain the microcapsule pigment in the amount of preferably 5 to 40% by mass, more preferably 10 to 40% by mass, and still more preferably 10 to 30% by mass, with respect to the total mass of the ink. By controlling the amount of the microcapsule pigment in the above range, a desirable coloration density can be achieved and deterioration of the ink outflow properties can be inhibited.

A ballpoint pen and a marking pen, which store the above ink, will now be described.

When the ink is filled in a ballpoint pen, the structure and shape of the ballpoint pen itself are not particularly limited, and examples thereof include a ballpoint pen having an ink-storing tube in which a shear-thinning ink is filled in an axial barrel, in which the ink-storing tube is connected with a ballpoint pen tip where a ball is mounted on its front-end, and a liquid plug for preventing backflow is closely contacted in the edge of the ink in the ink-storing tube.

The ballpoint pen tip will be described in more detail. There can be applied a tip formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring.

It is possible to apply the ball made of cemented carbide, stainless steel, ruby, ceramic, resin, rubber, and the like, which has a diameter of about 0.3 to 2.0 mm, preferably 0.3 to 1.5 mm, and more preferably 0.3 to 1.0 mm.

It is possible to use, as the ink-storing tube which stores the ink, for example, a molded body made of a thermoplastic resin such as polyethylene, polypropylene, polyethylene terephthalate or nylon or a metal tube.

The ink-storing tube may be directly connected with the tip, or the ink-storing tube may be connected with the tip via a connection member.

The ink-storing tube may be a refill type in which the refill is stored in an axial barrel made of a resin or metal, or the ink may be directly filled in an axial barrel in which the axial barrel mounting a tip in its front-end is used itself as an ink-storing tube.

When the ink is stored in a retractable ballpoint pen, the structure and shape of the retractable ballpoint pen are not particularly limited, and any structure can be adopted so long as the writing front-end provided in the ballpoint pen refill is received in the axial barrel while being exposed to the atmosphere and the writing front-end is protruded from the opening part of the axial barrel by actuation of the in-and-out type mechanism.

The retractable ballpoint pens can be classified into, for example, knock-type ballpoint pens, rotation-type ballpoint pens and slide-type ballpoint pens.

The knock-type ballpoint pens can take, for example, a configuration in which a knocking part is arranged on the rear end or side of the axial barrel and the ballpoint pen tip is projected from the front-end opening of the axial barrel by pushing the knocking part, or a configuration in which the ballpoint pen tip is projected from the front-end opening of the axial barrel by pushing a clip arranged on the axial barrel.

The rotation-type ballpoint pens can take, for example, a configuration in which a rotary part is arranged on a rear part of the axial barrel and the ballpoint pen tip is projected and retracted through the front-end opening of the axial barrel by rotating the rotary part.

The slide-type ballpoint pens can take, for example, a configuration in which a slide is arranged on the side of the axial barrel and the ballpoint pen tip is projected and retracted through the front-end opening of the axial barrel by operating the slide, or a configuration in which the ballpoint pen tip is projected and retracted through the front-end opening of the axial barrel by sliding a clip arranged on the axial barrel.

The retractable ballpoint pens may be of a complex type in which a plurality of ballpoint pen refills are stored in the axial barrel and the writing end of any one of the ballpoint pen refills is projected and retracted through the front-end opening of the axial barrel by the action of a projection-retraction mechanism.

An ink backflow preventive is filled at the rear end of the ink stored in the ink-storing tube.

The composition of the ink backflow preventive comprises a non-volatile liquid or a hardly volatile liquid.

Specific examples thereof include vaseline, spindle oil, castor oil, olive oil, mineral oil refineries, liquid paraffine, polybutene, α-olefine, oligomer or cooligomer of α-olefine, dimethyl silicone oil, methylphenyl silicone oil, amino modified silicone oil, polyether modified silicone oil, and fatty add modified silicone oil. These liquids can be used alone or in combination of two or more thereof.

It is preferable that the viscosity of the non-volatile liquid and/or hardly volatile liquid is increased to a suitable viscosity by adding a thickening agent. Examples of the thickening agent include silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate, aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound.

The liquid ink backflow preventive may be used in combination with a solid ink backflow preventive.

When the ink is filled in a marking pen, the structure and shape of the marking pen itself are not particularly limited, and examples thereof include a marking pen in which an ink occlusion body made of fiber bundle is embedded in an axial barrel, a marking pen tip made of a processed fiber having a capillary gap therein is mounted directly or via a connection member on the axial barrel, and a cohesive ink is impregnated in the ink occlusion body of the marking pen formed by connecting the ink occlusion body and the tip, or a marking pen in which the tip and the ink-storing tube are arranged through a valve body that opens by pressing the tip and the ink is directly stored in the ink-storing tube.

The tip is a generally known porous member having communication pores of which porosity is selected in the range of about 30 to 70%, made of processed resin of fibers, fusion processed bodies of hot-melt fiber, or a felt, and the tip is provided for practical use by processed its one end in a cannonball form, a rectangular form, or a chisel form depending on the use purpose.

The ink occlusion body is configured by bundling crimped fibers in a length direction, incorporating them into a covering material such as a plastic tube or a film, and adjusting its porosity in the range of about 40 to 90%.

As the valve body, a generally known pumping type may be used, and it is suitably a valve body in which a spring pressure is adjusted so that the valve can be opened by pen pressure.

The shape of the ballpoint pen or marking pen is not limited to those mentioned above, and may be a both head type writing instrument in which tips of different type are provided or pen ends for introducing inks of different colors are provided.

When the photochromic liquid composition is coated or printed, the material of the support is not specified and every material is effective, and examples thereof include papers, synthetic papers, fibers, fabrics, synthetic leathers, leathers, plastics, glasses, pottery materials, metals, woods and stones, which may be not only in a flat shape but also in an irregular form.

A photochromic layer containing a photochromic composition is arranged on the support to obtain a laminated body (printed article).

When a non-photochromic colored layer (including an image) has been formed on the support in advance, the colored layer can be made visible or invisible by applying thereto a photochromic layer, and this enables to further diversify the mode of change.

The photochromic composition according to the embodiments of the present invention can also be melt-blended with a thermoplastic resin, a thermosetting resin, wax or the like into the form of a pellet, powder or paste and utilized as a resin composition for photochromic molding. By widely used means such as injection molding, extrusion molding, blow molding or cast molding, a molded body in the form of a three-dimensional article of an arbitrary shape, film, sheet, plate, filament, rod, pipe or the like can be obtained.

It is also possible to obtain crayon, pencil core, mechanical pencil lead, toner and powder paint by melt-blending the photochromic composition into a thermoplastic resin or wax.

An ordinarily employed dyestuff or pigment may be added to the photochromic liquid composition or resin composition for photochromic molding to cause discoloration behavior from color (1) to color (2).

It is possible to improve the light fastness of the product by laminating a layer containing a light stabilizer and/or a transparent metalescent pigment on the laminated body or the molded body formed by using the resin composition for molding, or it is possible to improve the durability of the product by providing a topcoat layer thereon.

Examples of the light stabilizer include ultraviolet absorbers, antioxidants, singlet oxygen quenchers, superoxide anion quenchers and ozone quenchers.

Examples of the transparent metalescent pigment include pigments prepared by coating the surface of a core substance, such as natural mica, synthetic mica, glass piece, alumina or transparent film piece, with a metal oxide such as titanium oxide.

Specific examples of products using the photochromic composition, the microcapsule pigment or the resin particles include the followings.

(1) Toys:
  dolls or animal-figured toys; hair of dolls or animal-figured toys; dollhouses and furnitures thereof; doll accessories such as clothes, hats, bags and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings and food articles; and the like (2) Clothing:
  outerwears such as T-shirts, sweaters, blouses, dresses, swimsuits, raincoats and ski wears; footwears such as shoes and shoelaces; personal effects made of cloth, such as handkerchiefs, towels and wrapping cloths; gloves; neckties; hats; scarfs; mufflers; and the like (3) Interior Ornaments:
  runners, curtains, curtain cords, tablecloths carpets, cushions, carpets, rugs, chair upholsteries, sheets, mats, picture frames, imitation flowers, photo stands, and the like (4) Furnitures:
  beddings such as bedclothes, pillows and mattresses; lighting fixtures; and the like (5) Accessories:
  rings, bracelets, tiaras, earrings, hair stoppers, artificial nails, ribbons, scarfs, watches, glasses, and the like (6) Stationeries:
  writing instruments, stamps, erasers, celluloid boards, rulers, adhesive tapes, and the like (7) Daily Necessaries:
  cosmetics such as lipsticks, eye-shadows, manicures, hair dyes, artificial nails and paints for artificial nails; toothbrushes; and the like (8) Kitchen Utensils:
  cups, dishes, chopsticks, spoons, forks, pots, frying pans, and the like (9) Other Products:
  various printed articles such as calendars, labels, cards, recording materials and those for forgery prevention; indicators; books such as illustrated books; bags; packaging containers; embroidery threads; sporting gears; fishing tackles; coasters; musical instruments; pouches such as wallets; umbrellas; vehicles; buildings; training and learning articles; and the like.

EXAMPLES

While Examples will be illustrated below, the present invention is not limited thereto. "Part(s)" in the following Examples are by mass.

Example 1

Preparation of Photochromic Composition

1 Part of 3,3,9,9-tetra(4'-sec-butoxyphenyl)-3H,9H-naphtho[2,1-b:6,5-b']-dipyran was uniformly dissolved in 50 parts of a styrene-α-methylstyrene copolymer (manufactured by Eastman Chemical Company under the trade name of Picolastic A-5) under heating to obtain a photochromic composition.

Example 2

Preparation of Photochromic Microcapsule Pigment

After adding 60 parts of the photochromic composition of Example 1 in a mixed solution comprising 20 parts of an aromatic isocyanate prepolymer as a film-forming agent and 20 parts of ethyl acetate, the mixture thus obtained was added dropwise in 100 parts of an aqueous 15% gelatin solution in such a manner as to form microdroplets under stirring. Then, the reaction was performed while heating to prepare a microcapsule dispersion.

A photochromic microcapsule pigment was obtained from the microcapsule dispersion by the centrifugal separation method.

Formulations of the photochromic compositions of Examples 1 to 26, and with or without microcapsulation are shown in Tables 1 to 4 below. Each of the photochromic compositions of Examples 3 to 5 and Examples 10 to 26 was encapsulated in microcapsules in the same manner as in Example 2 to obtain a photochromic microcapsule pigment.

The number in parentheses in the tables indicates parts by mass.

TABLE 1

| Example | 1 | 2 | 3 |
|---|---|---|---|
| Photochromic compound | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) |
| Oligomer | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (25) Styrene-α-methylstyrene copolymer (weight-average molecular weight of 917) under the trade name of Picolastic A-75 (25) |
| Additives | — | — | — |
| With or without microcapsulation | Without microcapsulation | With microcapsulation | With microcapsulation |

| Example | 4 | 5 | 6 |
|---|---|---|---|
| Photochromic compound | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) |
| Oligomer | Acrylic acid ester copolymer (weight-average molecular weight of 1,700) under the trade name of ARUFON UP-1010 (50) | Acrylic acid ester copolymer (weight-average molecular weight of 8,000) under the trade name of ARUFON UP-1170 (50) | α-Pinene polymer (weight-average molecular weight of 833) under the trade name of Piccolite A115 (50) |
| Additives | — | — | — |
| With or without microcapsulation | With microcapsulation | With microcapsulation | Without microcapsulation |

| Example | 7 | 8 | 9 |
|---|---|---|---|
| Photochromic compound | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) |
| Oligomer | β-pinene polymer (weight-average molecular weight of 1,710) under the trade name of Piccolite S115 (50) | Styrene-α-methylstyrene copolymer (weight-average molecular weight of 317) under the trade name of Picolastic A-5 (40) α-Pinene-phenol copolymer (weight-average molecular weight of 1,050) under the trade name of YS POLYSTAR T145 (10) | Styrene-α-methylstyrene copolymer (weight-average molecular weight of 317) under the trade name of Picolastic A-5 (40) α-Pinene-phenol copolymer (weight-average molecular weight of 900) under the trade name of YS POLYSTAR T130 (10) |
| Additives | — | — | — |
| With or without microcapsulation | Without microcapsulation | Without microcapsulation | Without microcapsulation |

TABLE 2

| Example | 10 | 11 | 12 |
|---|---|---|---|
| Photochromic compound | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) | 3,3,9,9-Tetra(4'-sec-butoxyphenyl)-3H,9H-naphtho[2,1-b:6,5-b']-dipyran (1) |
| Oligomer | Styrene-α-methylstyrene copolymer (weight-average molecular weight of 317) under the trade name of Picolastic A-5 (42) | Styrene-α-methylstyrene copolymer (weight-average molecular weight of 317) under the trade name of Picolastic A-5 (42) | Styrene-α-methylstyrene copolymer (weight-average molecular weight of 317) under the trade name of Picolastic A-5 (42) |
| Additives | Benzotriazole-based ultraviolet absorber under the trade name of Tinuvin 928 (8) | Triazine-based ultraviolet absorber under the trade name of Tinuvin 400 (8) | Benzotriazole-based ultraviolet absorber under the trade name of Tinuvin 928 (6) |

TABLE 2-continued

| | | | Hindered amine-based light stabilizer under the trade name of Tinuvin 765 (2) |
|---|---|---|---|
| With or without microcapsulation | With microcapsulation | With microcapsulation | With microcapsulation |

| Example | 13 |
|---|---|
| Photochromic compound | 3,3,9,9-Tetra(4'-sec-butoxyphenyl)-3H,9H-naphtho[2,1-b:6,5-b']-dipyran (1) |
| Oligomer | Styrene-α-methylstyrene copolymer (weight-average molecular weight of 317) under the trade name of Picolastic A-5 (42) |
| Additives | Benzotriazole-based ultraviolet absorber under the trade name of Tinuvin 928 (6)<br>Hindered amine-based light stabilizer under the trade name of Tinuvin 144 (2) |
| With or without microcapsulation | With microcapsulation |

TABLE 3

| Example | 14 | 15 | 16 |
|---|---|---|---|
| Photochromic compound | 2,2,7,7-Tetra(4'-sec-butoxyphenyl)-2H,7H-naphtho[1,2-b:4,3-1:1-dipyran (1) | 2,2,8,8-Tetra(4'-sec-butoxyphenyl)-2H,8H-naphtho[1,2-b:5,6-b']-dipyran (1) | 3,3,8,8-Tetra(4'-sec-butoxyphenyl)-3H,8H-naphtho[2,1-b:5,6-b']-dipyran (1) |
| Oligomer | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) |
| Additives | — | — | — |
| With or without microcapsulation | With microcapsulation | With microcapsulation | With microcapsulation |

| Example | 17 | 18 | 19 |
|---|---|---|---|
| Photochromic compound | 2,2,10,10-Tetra(4'-sec-butoxyphenyl)-2H,10H-naphtho[1,2-b:7,8-b']-dipyran (1) | 3,3,6,6-Tetra(4'-sec-butoxyphenyl)-3H,6H-naphtho[2,1-b:3,4-b']-dipyran (1) | 3,3,9,9-Tetra(4'-isopropoxyphenyl)-3H,9H-naphtho[2,1-b:6,5-b']-dipyran (1) |
| Oligomer | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) |
| Additives | — | — | — |
| With or without microcapsulation | With microcapsulation | With microcapsulation | With microcapsulation |

| Example | 20 | 21 | 22 |
|---|---|---|---|
| Photochromic compound | 3,3,9,9-Tetra(4'-n-hexyloxyphenyl)-3H,9H-naphtho[2,1-b:6,5-b']-dipyran (1) | 3,3,9,9-Tetra(4'-n-octyloxyphenyl)-3H,9H-naphtho[2,1-b:6,5-b']-dipyran (1) | 3,3,10,10-Tetra(4'-sec-butoxyphenyl)-3H,10H-naphtho[2,1-b:7,8-bT dipyran (1) |
| Oligomer | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) |
| Additives | — | — | — |
| With or without microcapsulation | With microcapsulation | With microcapsulation | With microcapsulation |

TABLE 4

| Example | 23 | 24 | 25 |
|---|---|---|---|
| Photochromic compound | 3,3,10,10-Tetra(4'-sec-butoxyphenyl)-3H,10H-naphtho[2,1-b:7,8-b']-dipyran (1) | 3,3,10,10-Tetra(4'-sec-butoxyphenyl)-3H,10H-naphtho[2,1-b:7,8-b']-dipyran (1) | 3,3,10,10-Tetra(4'-sec-butoxyphenyl)-3H,10H-naphtho[2,1-b:7,8-b']-dipyran (1) |
| Oligomer | Styrene-α-methylstyrene copolymer (weight-average molecular weight of 317) under the trade name of Picolastic A-5 (42) | Styrene-α-methylstyrene copolymer (weight-average molecular weight of 317) under the trade name of Picolastic A-5 (42) | Styrene-α-methylstyrene copolymer (weight-average molecular weight of 317) under the trade name of Picolastic A-5 (42) |
| Additives | Benzotriazole-based ultraviolet absorber under the trade name of Tinuvin 928 (8) — | Triazine-based ultraviolet absorber under the trade name of Tinuvin 400 (8) — | Benzotriazole-based ultraviolet absorber under the trade name of Tinuvin 928 (6) Hindered amine-based light stabilizer under the trade name of Tinuvin 765 (2) |
| With or without microcapsulation | With microcapsulation | With microcapsulation | With microcapsulation |

| Example | 26 |
|---|---|
| Photochromic compound | 3,3,10,10-Tetra(4'-sec-butoxyphenyl)-3H,10H-naphtho[2,1-b:7,8-b']-dipyran (1) |
| Oligomer | Styrene-α-methylstyrene copolymer (weight-average molecular weight of 317) under the trade name of Picolastic A-5 (42) |
| Additives | Benzotriazole-based ultraviolet absorber under the trade name of Tinuvin 928 (6) Hindered amine-based light stabilizer under the trade name of Tinuvin 144 (2) |
| With or without microcapsulation | With microcapsulation |

Formulations of the photochromic compositions of Comparative Examples 1 to 4, and with or without microcapsulation are shown in Table 5 below. Each of the photochromic compositions of Comparative Examples 1 to 4 was encapsulated in microcapsules in the same manner as in Example 2 to obtain a photochromic microcapsule pigment.

The number in parentheses in the tables indicates parts by mass.

TABLE 5

| Comparative Example | 1 | 2 | 3 |
|---|---|---|---|
| Photochromic compound | 3,3,9,9-Tetra(4'-methoxyphenyl)-3H,9H-naphtho[2,1-b:6,5-b']-dipyran (1) | 3,3,6,6-Tetra(4'-methoxyphenyl)-3H,6H-naphtho[2,1-b:3,4-b']-dipyran (1) | 3,3,9,9-Tetraphenyl-3H,9H-naphtho[2,1-b:6,5-b']-dipyran (1) |
| Oligomer | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (50) | Styrene-α-methylstyrene copolymer (weight-average molecular weight of 317) under the trade name of Picolastic A-5 (25) |
| Additives | — | — | — |
| With or without microcapsulation | With microcapsulation | With microcapsulation | With microcapsulation |

| Comparative Example | 4 |
|---|---|
| Photochromic compound | 3,3,10,10-Tetra(4'-methoxyphenyl)-3H,10H-naphtho[2,1-b:7,8-b']-dipyran (1) |

TABLE 5-continued

| | |
|---|---|
| Oligomer | Styrene-α-methylstyrene copolymer (weight-average molecular weight of 317) under the trade name of Picolastic A-5 (50) |
| Additives | — |
| With or without microcapsulation | With microcapsulation |

Fabrications of Test Samples

Each of the photochromic compositions of Examples 1 to 26 and Comparative Examples 1 to 4 was dissolved in 100 parts of methyl ethyl ketone. The solution thus obtained was coated on a white synthetic paper using a bar coater so that the wet film thickness became 90 μm, followed by drying to obtain a test sample.

Color Tone Test

After each of the above test samples was irradiated with light from a light source [bulb-shaped fluorescent lamp manufactured by Toshiba Lighting & Technology, Corporation under the trade name of Neoball 5 Black Light EFD15BLB] placed 10 cm apart from the sample for 1 minute, the color tone at the time of coloration was visually confirmed. Furthermore, the color tone at the time of decolorization was visually confirmed.

Brightness Value Test

After each of the above test samples was irradiated with light from the light source placed 10 cm apart from the sample for 1 minute, the brightness value (converted from Y value) was measured by a color-difference meter [TC-3600 manufactured by Tokyo Denshoku Co., Ltd.]. Furthermore, the brightness value (converted from Y value) at the time of decolorization was measured by the color-difference meter.

The larger the brightness value is, the lower is the color density. The smaller the brightness value is, the higher is the color density.

Decolorization Speed Test

After each of the above test samples was irradiated with light from the light source placed 10 cm apart from the sample for 1 minute to develop a color, the time until decolorization (reaching the initial density) was measured.

Light Fastness Test

After each of the above test samples was continuously irradiated with light using a xenon light fastness tester [Table Sun XT75 manufactured by Suga Test Instruments Co., Ltd.] at an irradiance of 170 w/m$^2$ under a temperature environment of 35° C.

Each of the above test samples was taken out every 5 hours and irradiated with light from the light source to develop a color, and then the presence or absence of a discoloration function was confirmed, and the time during which the discoloration function disappeared was measured.

The results of the color tone test, the brightness value test, the decolorization speed test and the light fastness test of each of the test samples are shown in Tables 6 and 7 below.

TABLE 6

| | Color tone test | | Brightness value test | | | |
|---|---|---|---|---|---|---|
| Example | At the time of coloration | At the time of decolorization | At the time of coloration | At the time of decolorization | Decolorization speed test | Light fastness test |
| 1 | Red | White | 6.62 | 9.22 | 170 seconds | 10 hours |
| 2 | Red | White | 6.05 | 8.90 | 150 seconds | 10 hours |
| 3 | Red | White | 5.71 | 9.01 | 200 seconds | 10 hours |
| 4 | Red | White | 7.67 | 8.99 | 100 seconds | 10 hours |
| 5 | Red | White | 7.52 | 8.99 | 90 seconds | 10 hours |
| 6 | Red | White | 7.46 | 9.22 | 30 minutes or more | 10 hours |
| 7 | Red | White | 7.00 | 9.23 | 30 minutes or more | 10 hours |
| 8 | Red | White | 6.07 | 8.92 | 200 seconds | 10 hours |
| 9 | Red | White | 6.21 | 8.96 | 200 seconds | 10 hours |
| 10 | Red | White | 6.29 | 9.03 | 140 seconds | 45 hours |
| 11 | Red | White | 5.71 | 9.01 | 120 seconds | 20 hours |
| 12 | Red | White | 6.84 | 9.05 | 140 seconds | 65 hours |
| 13 | Red | White | 6.36 | 9.04 | 180 seconds | 65 hours |
| 14 | Orange | White | 6.51 | 8.99 | 200 seconds | 10 hours |
| 15 | Red | White | 6.87 | 8.99 | 170 seconds | 10 hours |
| 16 | Red | White | 6.54 | 9.01 | 150 seconds | 10 hours |
| 17 | Orange | White | 8.17 | 9.00 | 50 seconds | 15 hours |
| 18 | Orange | White | 6.83 | 8.88 | 300 seconds | 5 hours |
| 19 | Red | White | 6.33 | 8.85 | 120 seconds | 10 hours |
| 20 | Red | White | 6.45 | 8.82 | 150 seconds | 10 hours |
| 21 | Red | White | 6.67 | 8.90 | 130 seconds | 10 hours |
| 22 | Orange | White | 8.24 | 8.99 | 40 seconds | 15 hours |
| 23 | Orange | White | 8.68 | 9.00 | 30 seconds | 60 hours |
| 24 | Orange | White | 8.28 | 9.04 | 40 seconds | 30 hours |
| 25 | Orange | White | 8.94 | 9.10 | 40 seconds | 120 hours |
| 26 | Orange | White | 8.89 | 9.06 | 30 seconds | 120 hours |

TABLE 7

| Comparative Example | Color tone | | Brightness value test | | Decolorization speed test | Light fastness test |
|---|---|---|---|---|---|---|
| | At the time of coloration | At the time of decolorization | At the time of coloration | At the time of decolorization | | |
| 1 | Red | White | 7.81 | 9.04 | 80 seconds | 10 hours |
| 2 | Orange | White | 7.48 | 8.90 | 100 seconds | 5 hours |
| 3 | Orange | White | 6.74 | 9.01 | 600 seconds | 5 hours |
| 4 | Yellow | White | 8.91 | 9.02 | 10 seconds | 15 hours |

Application Example 1

Fabrication of Photochromic Display

10 Parts of the photochromic composition of Example 1 was mixed with 10 parts of toluene to prepare a photochromic liquid composition. A transparent polypropylene sheet was coated with the photochromic liquid composition using a wire coater in a wet film thickness of 50 μm, and after drying to provide a photochromic layer, a white paper was laminated thereon to obtain a photochromic display.

When viewed from the transparent polypropylene sheet side, the photochromic display was white before exposure to sunlight, but turned red when exposed to sunlight. Thereafter, when the photochromic display was left indoors for a while, it returned to its original white color.

Application Example 2

Fabrication Photochromic Ballpoint Pen 27.0 Parts of the photochromic microcapsule pigment of Example 2, 0.25 part of succinoglycan (organic acid-modified heteropolysaccharide whose constituent monosaccharides are glucose and galactose, shear-thinning tackifier), 10.0 parts of glycerin, 0.2 part of a fungicide [manufactured by Zeneca Inc. under the trade name of Proxel XL-2], 0.1 part of a defoamer [manufactured by SAN NOPCO Ltd. under the trade name of Nopco 8034] and 2.0 parts of a lubricant [manufactured by Dai-ichi Kogyo Seiyaku Co., Ltd. under the trade name of PLYSURF DB-01 (neutralized phosphoric acid ester)] were uniformly dispersed by stirring in 60.45 parts of water to obtain a photochromic ink for writing instrument.

After suction-filling 0.8 g of the photochromic ink for writing instrument into an ink-storing tube made of polypropylene, a holder made of a resin that holds a ballpoint pen tip holding a cemented carbide ball having a diameter of 0.8 mm at the tip of a stainless steel pipe was connected to the ink-storing tube. A viscoelastic ink backflow preventive (liquid plug) containing polybutene as a main component was filled at the rear of the ink, subjected to a centrifugal treatment and then assembled in an axial barrel to obtain a photochromic ballpoint pen.

When writing on JIS P3201 writing paper A under room light using the photochromic ballpoint pen, the handwriting was colorless, but when exposed to sunlight, it developed a red color. Thereafter, when the handwriting was left indoors for a while, it returned to its original colorlessness.

The photochromic ballpoint pen had high writing performance as a ballpoint pen without causing line skipping.

Application Example 3

Fabrication of Photochromic Toy

20 Parts of the photochromic microcapsule pigment of Example 4 was mixed with 30 parts of an acrylic resin/xylene solution, 20 parts of xylene, 20 parts of methyl isobutyl ketone and 10 parts of an isocyanate-based curing agent to prepare a photochromic spray paint. On the surface of a miniature car in which an ABS resin colored in yellowish green was injection-molded as a support, a photochromic layer was provided using the photochromic spray paint to obtain a photochromic toy.

The photochromic toy was yellowish green before exposure to sunlight, but turned brown when exposed to sunlight. Thereafter, when the photochromic toy was left indoors for a while, it returned to its original yellowish green.

When the photochromic toy was irradiated with light using a light irradiator equipped with an LED (peak emission wavelength 430 nm) as a light source at the tip, the irradiated portion changed from yellowish green to brown. After that, when the photochromic toy was left for a while, it returned to the original yellowish green color. This color change could be repeated. Since the above light source has a peak emission wavelength of 430 nm and irradiates blue light, it has little effect on the human body and is a highly safe toy.

Application Example 4

Fabrication of Doll Toy with Hairs Using Photochromic Composite Fibers

5 Parts of the photochromic microcapsule pigment of Example 12, 1 part of a dispersant, 94 parts of nylon 12 having a melting point of 180° C. and 0.1 part of a common blue pigment were melt-mixed with an extruder at 200° C. to prepare photochromic pellets for core part.

Photochromic pellets were fed into a core-forming extruder and nylon 12 natural pellets were fed into a sheath-forming extruder, respectively. Using a composite-fiber spinning apparatus, these materials were spun through ejection orifices with 18 holes at 200° C. in a core-sheath volume ratio of 6:4 to prepare a photochromic composite fiber composed of 18 single yarns having an outer diameter of 90 μm.

The photochromic composite fibers were transplanted to the head of the doll by a conventional method to obtain a doll toy with hairs using the photochromic composite fibers.

The hair of a doll toy was blue before exposure to sunlight, but turned purple when exposed to sunlight. Thereafter, when the doll toy was left indoors for a while, it returned to its original blue color.

When the hair of the doll toy was irradiated with light using a light irradiator equipped with an LED (peak emission wavelength of 430 nm) as a light source at the tip, the irradiated portion changed from blue to purple.

Thereafter, when the doll toy was left for a while, it returned to its original blue color. This color change could be repeated. Since the above light source has a peak emission wavelength of 430 nm and irradiates blue light, it has little effect on the human body and is a highly safe toy.

Application Example 5

Fabrication of Photochromic Molded Body

75 Parts of the photochromic microcapsule pigment of Example 18 and 750 parts of medium- and low-pressure polyethylene were mixed, and then the mixture was extruded at a molding temperature of 160° C. to 170° C. using an extruder and pelletized by a pelletizer to prepare photochromic pellets.

Using the photochromic pellets, a 1 mm thick photochromic molded body was obtained using an injection molding machine at a setting temperature of 160° C. to 170° C.

The photochromic molded body was white before exposure to sunlight, but turned orange when exposed to sunlight. Thereafter, when the photochromic molded body was left indoors for a while, it returned to its original white color.

Application Example 6

Fabrication of Photochromic Printed Matter

40 Parts of the photochromic microcapsule pigment of Example 22 was uniformly mixed in a vehicle comprising 58 parts of an ethylene-vinyl acetate copolymer resin emulsion, 3 parts of a defoamer, 1 part of a thickener, 3 parts of a leveling agent and 1 part of a preservative to prepare a photochromic screen ink.

On a white synthetic paper as a support, a photochromic layer with a star pattern was provided by screen printing using the photochromic screen ink to obtain a photochromic printed matter.

The photochromic printed matter was white before exposure to sunlight, but when exposed to sunlight, an orange star pattern appeared. Thereafter, when the photochromic printed matter was left indoors for a while, the star pattern disappeared and returned to the original white color.

This application claims priority based on Japanese Patent Application 2018-244604 filed on Dec. 27, 2018, the disclosure of which is incorporated by reference herein.

The invention claimed is:

1. A photochromic composition comprising a photochromic compound represented by the following formula (1) and an oligomer:

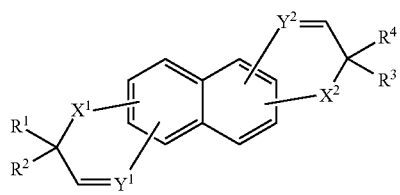

(1)

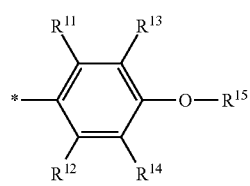

(2)

wherein, in the formula (1), $X^1$ and $X^2$ represent an oxygen atom, $Y^1$ and $Y^2$ represent CH, $R^1$, $R^2$, $R^3$ and $R^4$ represent formula (2), $R^{11}$, $R^{12}$, $R^{13}$ and $R^{14}$ represent a hydrogen atom, a halogen atom, a hydroxyl group, a nitrile group, an alkyl group, an aryl group, an alkoxy group, an aryloxy group, an acyl group, an alkoxycarbonyl group or an aryloxycarbonyl group, $R^{15}$ represents an alkyl group having 3 or more carbon atoms, * represents a binding site to a pyran skeleton, and $X^1$ and $Y^1$, and $X^2$ and $Y^2$ are each bonded to adjacent carbon atoms of the carbon atoms constituting a naphthalene skeleton.

2. The photochromic composition according to claim 1, wherein the formula (1) is any one of the following formulas (3), (4), (5), (6), (7) and (8) and (9):

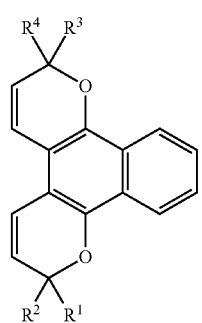

(3)

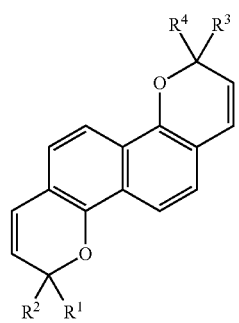

(4)

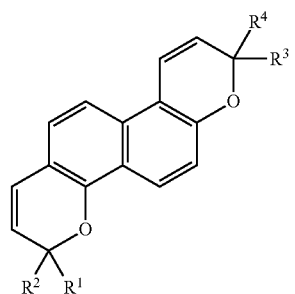

(5)

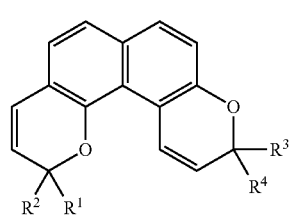

(6)

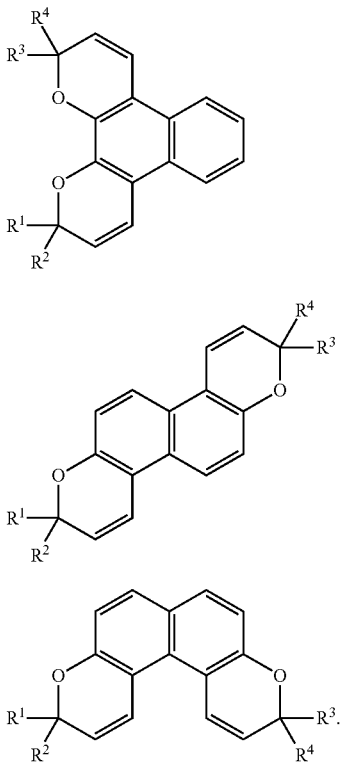

3. The photochromic composition according to claim 2, wherein the formula (1) is any one of the formulas (7), (8) and (9).

4. The photochromic composition according to claim 1, wherein $R^{15}$ is an alkyl group having 3 or more and 8 or less carbon atoms.

5. The photochromic composition according to claim 2, wherein $R^{15}$ is an alkyl group having 3 or more and 8 or less carbon atoms.

6. The photochromic composition according to claim 3, wherein $R^{15}$ is an alkyl group having 3 or more and 8 or less carbon atoms.

7. The photochromic composition according to claim 1, wherein the oligomer is an oligomer selected from the group consisting of a styrene-based oligomer having a weight-average molecular weight of 200 to 6,000, an acrylic oligomer having a weight-average molecular weight of 12,000 or less, a terpene-based oligomer having a weight-average molecular weight of 250 to 4,000 and a terpenephenol-based oligomer having a weight-average molecular weight of 200 to 2,000.

8. The photochromic composition according to claim 7, wherein a weight ratio of the photochromic compound to the styrene-based oligomer or the acrylic oligomer is in the range of 1:1 to 1:10000.

9. The photochromic composition according to claim 7, wherein a weight ratio of the photochromic compound to the terpene-based oligomer is in the range of 1:1 to 1:5000.

10. The photochromic composition according to claim 7, wherein a weight ratio of the photochromic compound to the terpenephenol-based oligomer is in the range of 1:1 to 1:50.

11. The photochromic composition according to claim 1, wherein the photochromic compound and the oligomer are encapsulated in microcapsules or dispersed in resin particles.

12. The photochromic composition according to claim 2, wherein the photochromic compound and the oligomer are encapsulated in microcapsules or dispersed in resin particles.

13. The photochromic composition according to claim 3, wherein the photochromic compound and the oligomer are encapsulated in microcapsules or dispersed in resin particles.

14. The photochromic composition according to claim 1, further comprising an ultraviolet absorber.

15. The photochromic composition according to claim 14, further comprising a hindered amine-based light stabilizer.

16. A photochromic liquid composition comprising the photochromic composition according to claim 1 and a vehicle.

17. The photochromic liquid composition according to claim 16, which is selected from the group consisting of a printing ink, a writing instrument ink, an applicator ink, an inkjet ink, a paint, an ultraviolet curable ink, a drawing color, a cosmetic and a fabric-coloring fluid.

18. A photochromic molding resin composition comprising the photochromic composition according to claim 1 and a molding resin.

19. A photochromic molded body obtained by molding the photochromic molding resin composition according to claim 18.

20. A photochromic laminated body comprising a support and a photochromic layer containing the photochromic composition according to claim 1 provided on the support.

21. An article comprising the photochromic composition according to claim 1.

22. The article according to claim 21, which is a toy, a packaging container, an embroidery thread or an indicator.

* * * * *